(12) United States Patent
Chiou et al.

(10) Patent No.: US 8,542,167 B2
(45) Date of Patent: Sep. 24, 2013

(54) PROJECTION TYPE DISPLAY APPARATUS

(75) Inventors: Yu-Wen Chiou, Tainan County (TW);
Biing-Seng Wu, Tainan County (TW);
Lin-Kai Bu, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 1320 days.

(21) Appl. No.: 11/832,419

(22) Filed: Aug. 1, 2007

(65) Prior Publication Data
US 2009/0033603 A1 Feb. 5, 2009

(51) Int. Cl.
*G09G 3/34* (2006.01)

(52) U.S. Cl.
USPC .......................................................... 345/84

(58) Field of Classification Search
USPC ......... 345/7, 8, 55, 82, 32, 84; 359/629–633; 348/115, 746; 385/27
See application file for complete search history.

(56) References Cited

U.S. PATENT DOCUMENTS

| | | | | |
|---|---|---|---|---|
| 4,099,841 A * | 7/1978 | Ellis | | 359/630 |
| 5,300,942 A * | 4/1994 | Dolgoff | | 345/32 |
| 6,547,400 B1 * | 4/2003 | Yokoyama | | 353/98 |
| 6,674,415 B2 * | 1/2004 | Nakamura et al. | | 345/32 |
| 7,002,537 B1 * | 2/2006 | Ito | | 345/87 |
| 7,088,321 B1 * | 8/2006 | Parker | | 345/83 |
| 7,098,900 B2 * | 8/2006 | Ozawa | | 345/204 |
| 2001/0022565 A1 * | 9/2001 | Kimura | | 345/82 |
| 2002/0057253 A1 * | 5/2002 | Lim et al. | | 345/102 |
| 2003/0128199 A1 * | 7/2003 | Kimura | | 345/204 |
| 2004/0263500 A1 * | 12/2004 | Sakata | | 345/204 |
| 2005/0162360 A1 * | 7/2005 | Ishihara et al. | | 345/89 |
| 2005/0243223 A1 * | 11/2005 | Slobodin | | 349/7 |
| 2005/0275611 A1 * | 12/2005 | Aoki | | 345/96 |
| 2006/0092117 A1 * | 5/2006 | Kubota et al. | | 345/94 |
| 2006/0232601 A1 * | 10/2006 | Kimura et al. | | 345/605 |
| 2008/0007573 A1 * | 1/2008 | Takeuchi et al. | | 345/690 |

* cited by examiner

*Primary Examiner* — Quan-Zhen Wang
*Assistant Examiner* — Nelson D Runkle, III
(74) *Attorney, Agent, or Firm* — Lowe Hauptman & Ham, LLP

(57) ABSTRACT

A display apparatus has several light emitting elements and several lenses. The light emitting elements generate light of a first and second part of a frame respectively during a first and second period. The lenses pass through by the light from the light emitting elements, and operate to form images of the first and second part of the frame at a first and second location during the first and second period, respectively.

3 Claims, 3 Drawing Sheets

PROJECTION TYPE DISPLAY APPARATUS

BACKGROUND

1. Field of Invention

The present invention relates to a display apparatus, and more particularly relates to a display apparatus with projection type image.

2. Description of Related Art

Conventional projection type display apparatuses project a whole image frame onto an object in one flash rather than by sequentially scanning lines of the frame. For a projection type display having light emitting diodes as the light source, such a projection mechanism necessitates a large number of light emitting diodes equal to the number of pixels of one frame, which increases the cost. Therefore, it is necessary to provide a new projection mechanism necessitating only a small number of light emitting diodes.

SUMMARY

According to one embodiment of the present invention, the display apparatus has several light emitting elements and several lenses. The light emitting elements generate light of a first and second part of a frame respectively during a first and second period. The lenses pass through by the light from the light emitting elements, and operate to form images of the first and second parts of the frame at a first and second locations during the first and second periods, respectively.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
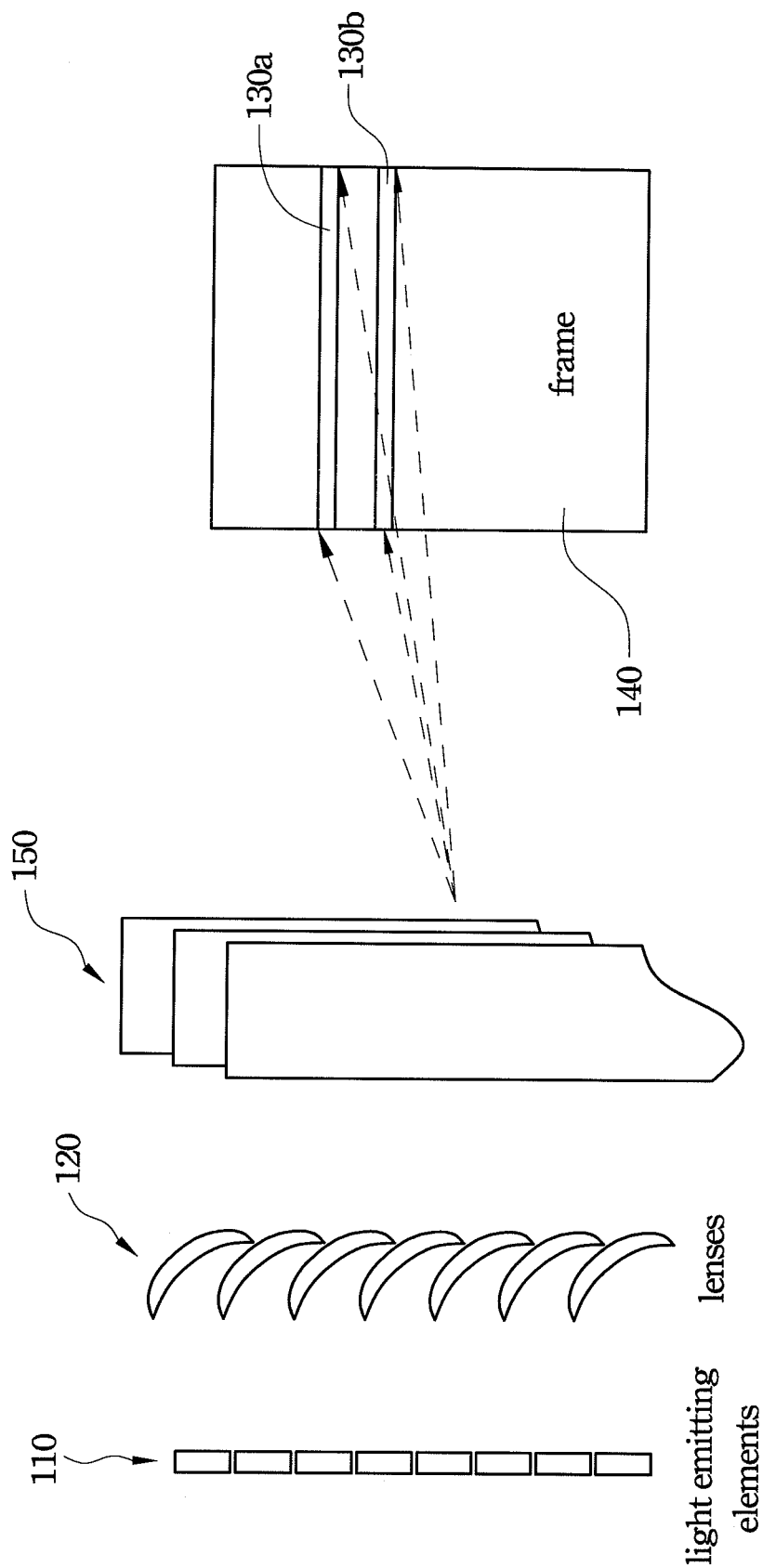
FIG. 1 shows a display apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 shows a display apparatus according to an embodiment of the invention. The display apparatus has several light emitting elements 110 and several lenses 120. The light emitting elements 110 generate light for a first and second part of a frame 140 respectively during a first and second period. In the example, the light emitted from the light emitting elements 110 passes through the lenses 120, and the lenses 120 are operated to form images 130a and 130b of the first and second parts, which may be disposed at a first and second location of the frame 140 (e.g. two separate, or partially or fully overlapping lines, regions, dots or etc.), during the first and second period, respectively.

The display apparatus further has several films or devices 150 located between the light emitting elements 110 and the lenses 120 (not shown), or located between the lenses 120 and the frame 140. The films or devices 150 are used to offer some optical functions, such as the functions of focus, reflection or polarization.

Namely, the display apparatus projects the frame 140 on, for example, a projection screen. The light emitting elements 110 are arranged to sequentially generate parts of the image. The lenses 120 are arranged to respectively form the image from the light generated by the light emitting elements 110.

The light emitting elements 110 are arranged in a single line and generate the light of a line of the frame. Therefore, the light of one line forms the whole image sequentially.

The light emitting elements 110 can be organic light emitting diodes, and the light emitting elements 110 has red, green, and blue light emitting elements (not shown). Therefore, the light emitting elements 110 in FIG. 1 can generate the whole image part by part (e.g. line by line), wherein each part of image is synchronized with red, green, and blue colors already.

Figure 2:
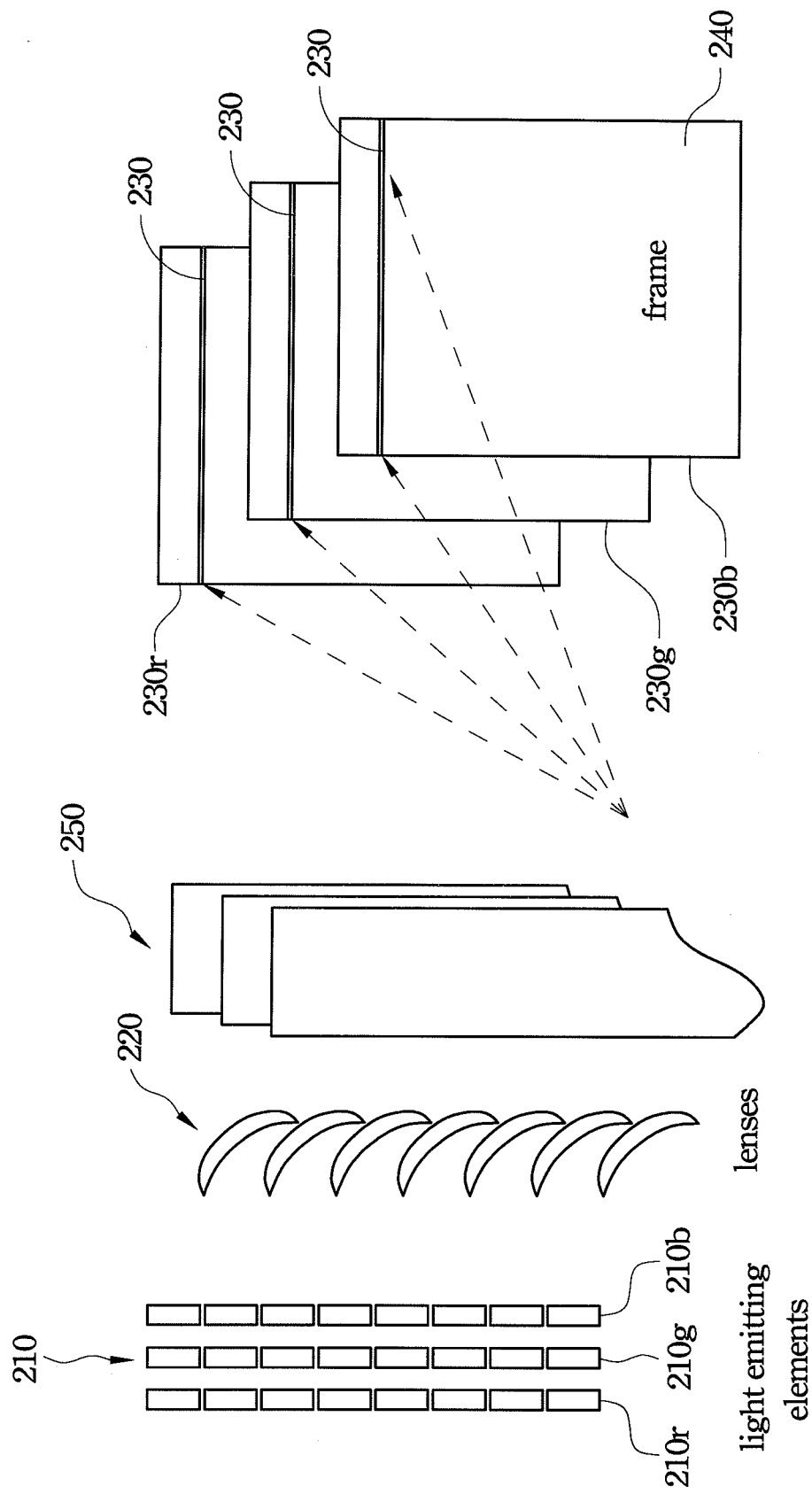
FIG. 2 shows a display apparatus according to another embodiment of the invention.

FIG. 2 shows a display apparatus according to another embodiment of the invention. The display apparatus has several light emitting elements 210 and several lenses 220. The light emitting elements 210 generate light for several parts of a frame 240 respectively during several periods. The light emitted from the light emitting elements 210 passes through the lenses 220, and the lenses 220 are operated to form images 230 of the parts of the frame 240 at several locations during the periods respectively.

The display apparatus further has several films or devices 250 located between the light emitting elements 210 and the lenses 220 (not shown), or located between the lenses 220 and the frame 240. The films or devices 250 are used to offer some optical functions, such as the functions of focus, reflection or polarization.

The light emitting elements 210 are organic light emitting diodes, and the light emitting elements 210 has red, green, and blue light emitting elements to respectively generate red, green and blue images 230r, 230g and 230b part by part.

The images 230 of different parts of the frame 240 formed by the lenses 220 overlap with each other. Namely, the whole final image is formed by overlapping the red, green and blue images 230r, 230g and 230b, wherein each of the images 230r, 230g and 230b is formed by the lenses 220 part by part.

The red, green and blue organic light emitting elements are respectively arranged in three lines 210r, 210g and 210b. When the display apparatus operates, a location of an image (such as the image 230g) formed by the light emitted from the light emitting elements of the second line (such as the line 210g) during the second period is the same as a location of an image (such as the image 230r) formed by the light emitted from the light emitting elements of the first line (such as the line 210r) during the first period. Therefore, each location (part) of the image is formed by the light from the red, green and blue organic light emitting elements located in the three lines 210r, 210g and 210b.

Figure 3:
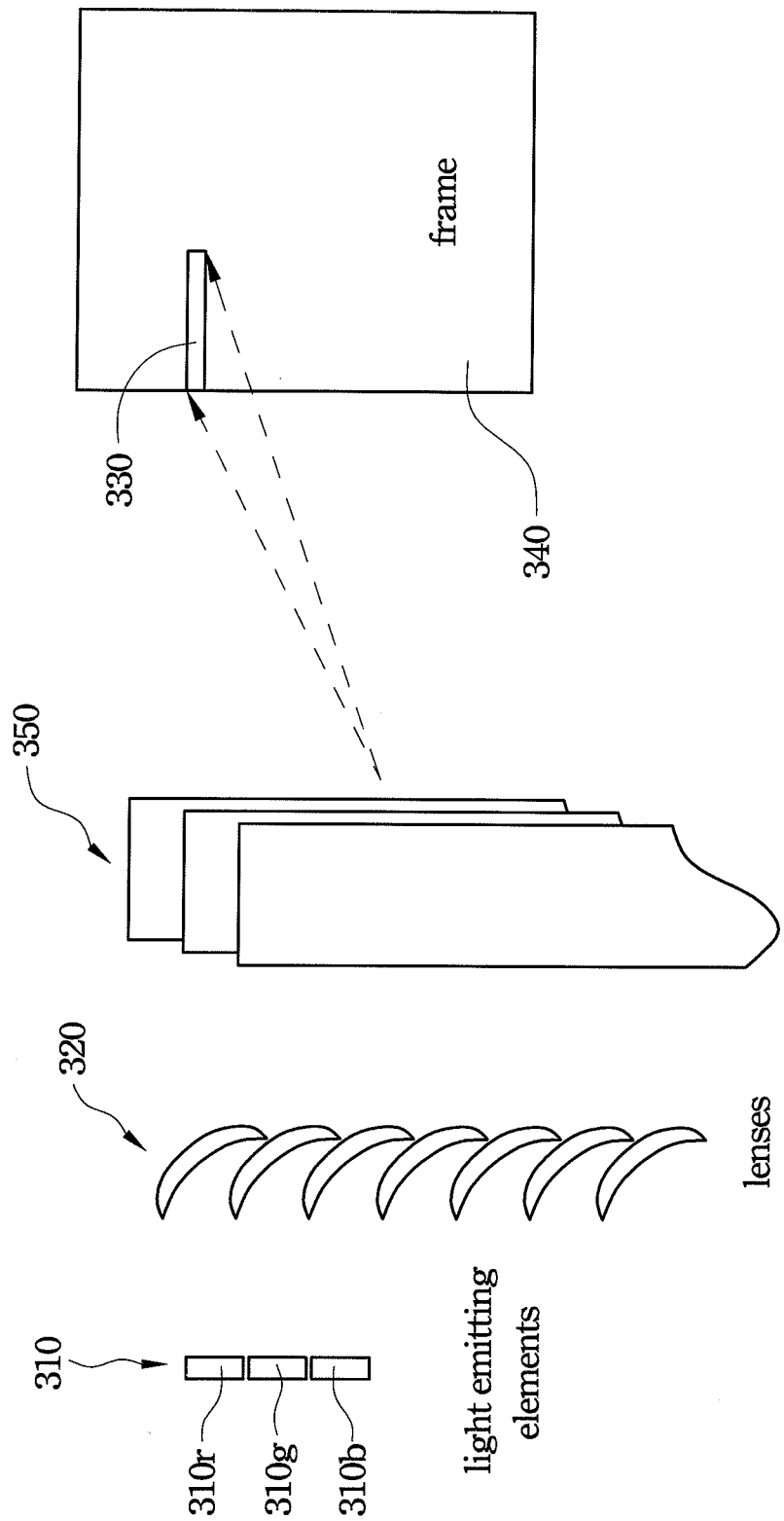
FIG. 3 shows a display apparatus according to another embodiment of the invention.

FIG. 3 shows a display apparatus according to another embodiment of the invention. The display apparatus has several light emitting elements 310 and several lenses 320. The light emitting elements 310 generate light for several parts of a frame 340 respectively during several periods. The light emitted from the light emitting elements 310 passes through the lenses 320, and the lenses 320 are operated to form images 330 of the parts of the frame 340 at several locations during the periods respectively.

The display apparatus further has several films or devices 350 located between the light emitting elements 310 and the lenses 320 (not shown), or located between the lenses 320 and the frame 340. The films or devices 350 are used to offer some optical functions, such as the functions of focus, reflection or polarization.

The light emitting elements 310 are arranged in a single line and generate the light of a part of a line of the frame. Therefore, the light of the part of the line forms the whole image sequentially.

The light emitting elements 310 are organic light emitting diodes, and the light emitting elements include only one red, green, and blue organic light emitting elements 310r, 310g and 310b. Therefore, the light emitting elements 310 in FIG. 3 can generate the whole image part by part.

The red, green and blue organic light emitting elements 310r, 310g and 310b generate light for forming parts of the image sequentially. When the display apparatus operates, a location of an image formed by the light from the green light emitting element 310g during the second period is the same as a location of an image formed by the light from the red light emitting element 310r during the first period. Therefore, each location (part) of the image is formed by the light from the red, green and blue organic light emitting elements 310r, 310g and 310b.

Moreover, the red, green and blue organic light emitting elements 310r, 310g and 310b can overlap a part of the image at the same time, and therefore the part of the image is synchronized with red, green, and blue colors. Thereafter, the red, green and blue organic light emitting elements 310r, 310g and 310b generate the whole image part by part.

In the embodiments of the FIG. 1, FIG. 2 and FIG. 3, the images of the first and second parts of the frame are real images and formed on a screen. Namely, the image is projected on the screen, and humans can see the image from the screen. Alternatively, the images of the first and second parts of the frame can be virtual images (not shown). Namely, the finale image is projected on humans' eyes, and humans can see the image directly.

By the description above, the embodiments of this invention can use fewer light emitting elements to generate images by projecting sequentially. Therefore, the cost is possible to be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display apparatus, comprising:
 a plurality of light emitting elements for generating light of first and second lines of a frame respectively during first and second periods; and
 a plurality of lenses arranged in a single line, through which the light generated by the light emitting elements directly passes, the lenses configured to
  project the light at a first location during the first period to form an image of the first line of the frame, and
  project the light at a second location during the second period to form an image of the second line of the frame,
 wherein the light emitting elements comprise red, green, and blue light emitting elements,
 wherein the image of the first line of the frame and the image of the second line of the frame formed by the lenses overlap with each other,
 wherein the red, green and blue light emitting elements are respectively arranged in three different rows,
 wherein the red light emitting elements are arranged in a first row, the green light emitting elements are arranged in a second row, and the blue light emitting elements are arranged in a third row,
 wherein the image of the first line of the frame is formed by light from the first row and the second row of the light emitting elements at the first location during the first period,
 wherein the image of the second line of the frame is formed by light from the second row and the third row of the light emitting elements at the second location during the second period, and
 wherein the first location and the second location are the same location.

2. The display apparatus as claimed in claim 1, wherein the light emitting elements are organic light emitting diodes.

3. The display apparatus as claimed in claim 1, wherein the image of the second line of the frame during the second period is configured to completely cover the image of the first line of the frame during the first period.

* * * * *